United States Patent
Glaser

(10) Patent No.: US 8,007,023 B2
(45) Date of Patent: Aug. 30, 2011

(54) PROTECTIVE SUNSHADE FOR A VEHICLE WINDOWPANE

(75) Inventor: Carsten Glaser, Mühltal (DE)

(73) Assignee: GM Global Technology Operations LLC, Detroit, MI (US)

( * ) Notice: Subject to any disclaimer, the term of this patent is extended or adjusted under 35 U.S.C. 154(b) by 70 days.

(21) Appl. No.: 12/427,503

(22) Filed: Apr. 21, 2009

(65) Prior Publication Data

US 2009/0267378 A1 Oct. 29, 2009

(30) Foreign Application Priority Data

Apr. 24, 2008 (DE) .................. 10 2008 020 542

(51) Int. Cl.
*B60J 3/02* (2006.01)
(52) U.S. Cl. .................. 296/97.8; 160/370.22
(58) Field of Classification Search .......... 296/97.4, 296/97.8, 97.11; 160/370.22
See application file for complete search history.

(56) References Cited

U.S. PATENT DOCUMENTS

| | | | |
|---|---|---|---|
| 3,075,805 A | 1/1963 | Golde et al. | |
| 4,758,041 A | 7/1988 | Labeur | |
| 5,201,810 A | 4/1993 | Ojima et al. | |
| 5,810,065 A | 9/1998 | Solari | |
| 6,513,864 B2 | 2/2003 | Boehm et al. | |
| 6,857,693 B2 | 2/2005 | Hattass et al. | |
| 2004/0160082 A1* | 8/2004 | Bohm et al. | 296/97.11 |
| 2008/0142172 A1 | 6/2008 | Hansen et al. | |
| 2009/0072574 A1* | 3/2009 | Tominaga et al. | 296/97.4 |

FOREIGN PATENT DOCUMENTS

| | | |
|---|---|---|
| DE | 1102581 B | 3/1961 |
| DE | 8126849 U1 | 4/1982 |
| DE | 3140756 A1 | 4/1983 |
| DE | 3429880 A1 | 2/1986 |
| DE | 19539631 A1 | 5/1996 |
| DE | 19603534 A1 | 8/1997 |
| DE | 19808599 C1 | 7/1999 |
| DE | 10039522 A1 | 2/2002 |
| DE | 10163821 A1 | 7/2003 |
| DE | 10223684 A1 | 12/2003 |
| DE | 10228410 B4 | 1/2004 |
| DE | 10244156 A1 | 4/2004 |
| DE | 10315635 A1 | 11/2004 |
| DE | 10360629 A1 | 7/2005 |
| DE | 10660629 A1 | 7/2005 |
| DE | 102004003912 A1 | 8/2005 |
| DE | 102005038373 A1 | 2/2007 |
| DE | 102005057740 A1 | 6/2007 |
| DE | 102006053505 A1 | 5/2008 |
| EP | 1683666 A2 | 7/2006 |

OTHER PUBLICATIONS

German Search Report dated Mar. 26, 2009, issued in Application No. 102008020542.7.

* cited by examiner

*Primary Examiner* — Joseph D Pape
(74) *Attorney, Agent, or Firm* — Ingrassia Fisher & Lorenz, P.C.

(57) ABSTRACT

A protective sunshade arrangement is provided for the windowpane of a motor vehicle with a frame that features two opposing longitudinal struts for guiding a cover that can be extracted in an extracting direction from a cover roller arranged between the longitudinal struts. The frame furthermore features at least one first transverse strut that extends between the longitudinal struts and is arranged behind the cover roller referred to the extracting direction.

12 Claims, 2 Drawing Sheets

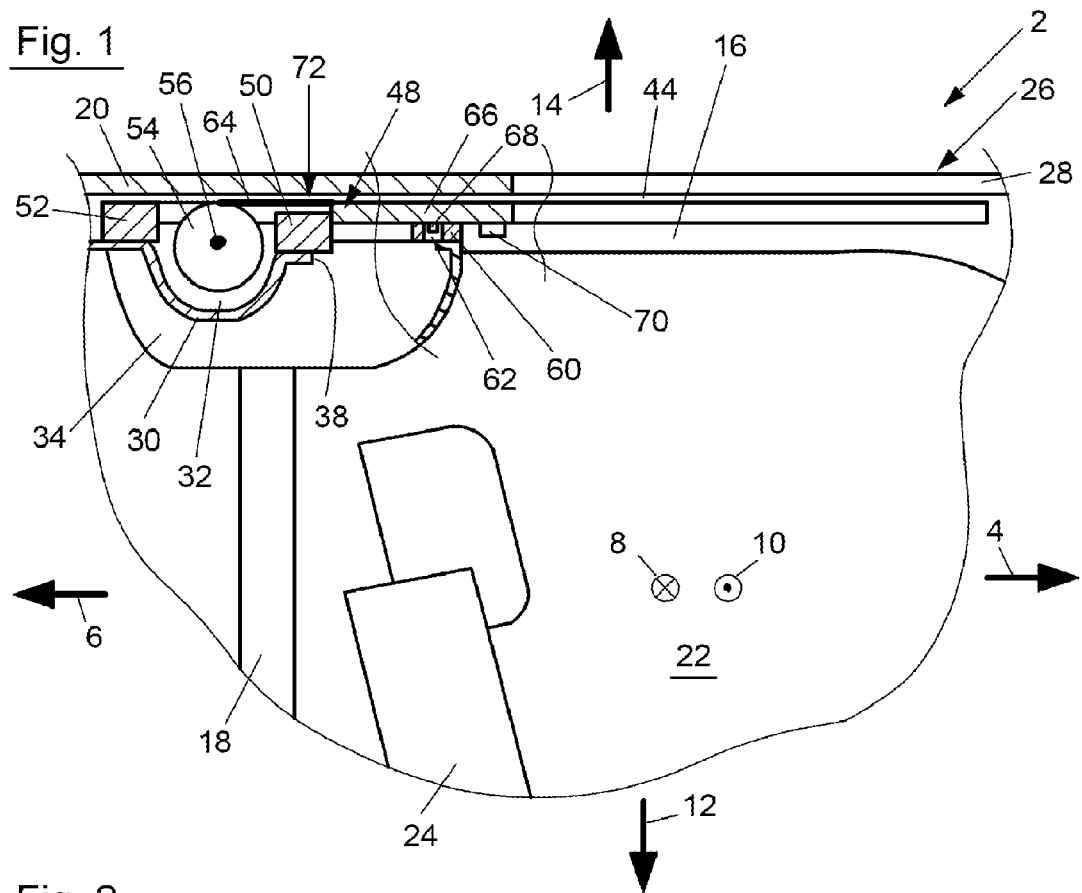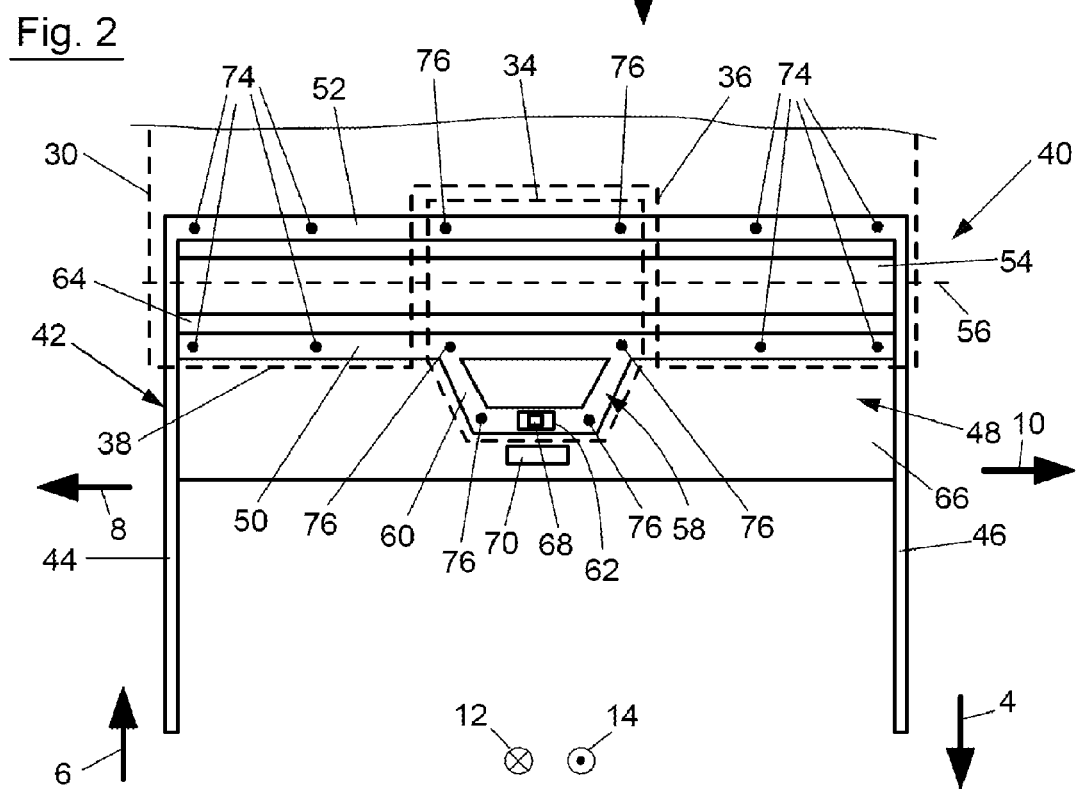

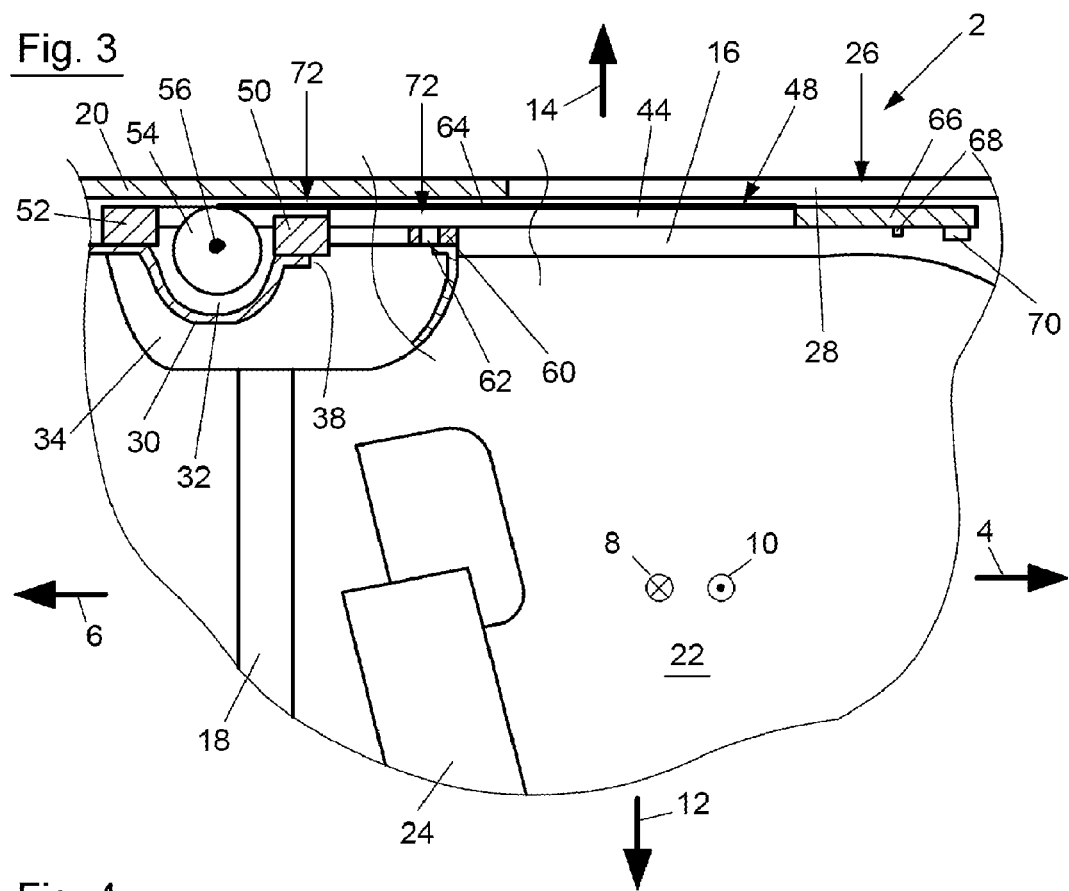
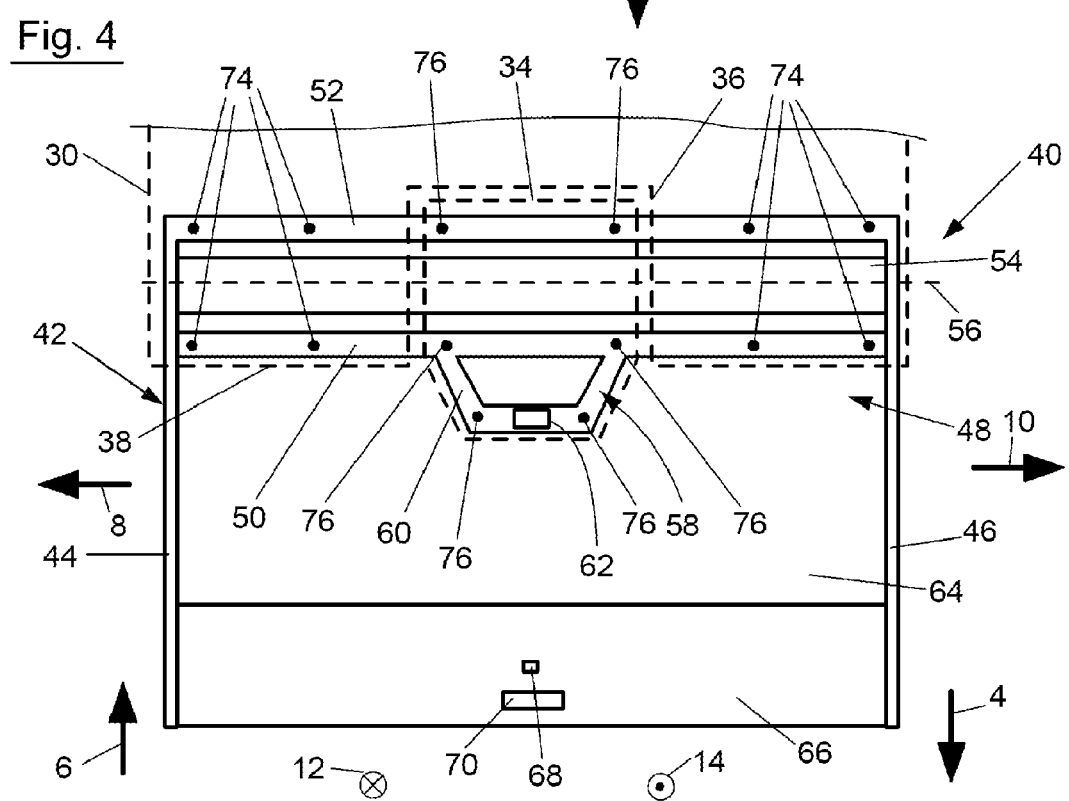

PROTECTIVE SUNSHADE FOR A VEHICLE WINDOWPANE

CROSS-REFERENCE TO RELATED APPLICATION

This application claims priority to German Patent Application No. 102008020542.7, filed Apr. 24, 2008, which is incorporated herein by reference in its entirety.

Technical Field

The present invention pertains to a protective sunshade arrangement for the windowpane of a motor vehicle with a frame that features two opposing longitudinal struts for guiding a cover that can be extracted in an extracting direction from a cover roller arranged between the longitudinal struts. The present invention furthermore pertains to a motor vehicle with such a protective sunshade arrangement.

Background

Motor vehicles with protective sunshade arrangements for a windowpane of the motor vehicle, preferably a roof windowpane of the motor vehicle, are known from the state of the art. Known protective sunshade arrangements feature a cover that can be extracted in an extracting direction from a cover roller arranged between the inside roof lining and the vehicle roof in order to partially or entirely cover the roof windowpane. Known protective sunshade arrangements furthermore comprise two opposing longitudinal struts that are arranged laterally of the roof windowpane and serve for guiding the cover. The cover roller of the known protective sunshade arrangement extends transverse to the longitudinal struts and is arranged between these struts. In order to extract the cover from the receptacle space between the inside roof lining and the vehicle roof, a gap extending in the transverse direction is provided between the front edge of the inside roof lining and the vehicle roof, and the cover is guided through the gap from an idle position into an operative position and vice versa.

Although the above-described state of the art proved successful, it is afflicted with the few disadvantages. Due to the gap between the inside roof lining and the vehicle roof, the inside roof lining can only be insufficiently mounted within the motor vehicle in this region. The inside roof lining also does not have the required stability in the region of the gap such that no other heavy functional components can be arranged at this location. In addition, a heavier roof console that, if applicable, protrudes forward also cannot be mounted in this region because the gap always needs to remain in order to guide through the cover.

Consequently, the present invention is based on at least one objective of developing a protective sunshade arrangement for the windowpane of a motor vehicle that allows the stable mounting of the inside roof lining or a console without requiring an additional cover for the cover roller of the protective sunshade arrangement. Another objective of the present invention consists of a developing a motor vehicle with such a protective sunshade arrangement, in which an inside roof lining and, if applicable, a roof console can securely arranged. In addition, other objectives, desirable features, and characteristics will become apparent from the subsequent summary and detailed description, and the appended claims, taken in conjunction with the accompanying drawings and this background.

SUMMARY

The protective sunshade arrangement according to an embodiment of the invention for the windowpane of a motor vehicle features a frame. The frame has two opposing longitudinal struts that serve for guiding a cover of the protective sunshade arrangement. For example, the longitudinal struts may be realized in the form of guide rails for the cover. The cover can be extended or extracted in an extracting direction from a cover roller arranged between the longitudinal struts. In this case, the extracting direction can be defined, for example, by the orientation of the longitudinal struts guiding the cover. The frame furthermore features at least one first transverse strut that extends between the longitudinal struts, and the transverse strut is arranged behind the cover roller referred to the extracting direction.

In a motor vehicle with the protective sunshade arrangement according to an embodiment of the invention, an inside roof lining and/or a roof console can be arranged in front of the cover roller of the protective sunshade arrangement in such a way that the cover roller is concealed, and the inside roof lining and/or the roof console may be mounted on the first transverse strut. Due to this measure, the roof console or the inside roof lining respectively has the required stability, for example, for accommodating other heavy functional components. The gap for guiding through the cover therefore is no longer arranged directly between the inside roof lining and the vehicle roof or the windowpane, but can be realized between the transverse strut and the vehicle roof or the windowpane, respectively. An additional cover for the cover roller is not required because it can be safely concealed by the inside roof lining or the roof console.

In order to increase the stability of the frame of the protective sunshade arrangement and to achieve an even more secure installation of the inside roof lining or a roof console in the motor vehicle, the frame of one advantageous embodiment of the protective sunshade arrangement according to the invention furthermore features a second transverse strut that extends between the longitudinal struts, but is arranged in front of the cover roller referred to the extracting direction.

Although it would be possible, in principle, to realize one of the two transverse struts in an interrupted fashion in the transverse direction, the first and/or second transverse strut of another advantageous embodiment of the protective sunshade arrangement according to the invention extend(s) continuously from one longitudinal strut to the other longitudinal strut in order to increase the stability of the frame of the protective sunshade arrangement.

In one particularly advantageous embodiment of the protective sunshade arrangement according to the invention, the frame furthermore features a console support section that is arranged behind the first transverse strut referred to the extracting direction and preferably mounted centrally on the first transverse strut. Consequently, this console support section can serve for securely installing a roof console that protrudes in the extracting direction. The console support section and the first transverse strut make it possible to mount the roof console with the required stability, for example, for also accommodating other heavy functional components.

In one preferred embodiment of the protective sunshade arrangement according to the invention, the console support section is realized in the form of an essentially U-shaped strut. For example, the ends of the U-shaped strut can be mounted on the first transverse strut. Due to the U-shaped strut, the console support section has a particularly simple design, but still allows the stable mounting of a roof console or the like.

In another preferred embodiment of the protective sunshade arrangement according to the invention, mounting means for an inside roof lining and/or a console, preferably a roof console, are provided on the first transverse strut, the second transverse strut and/or the console support section. In this case, the mounting means are preferably realized in the form of mounting recesses or mounting depressions. Associated mounting means can also be provided, for example, on the inside roof lining and/or the console or components of the console, respectively, such that the inside roof lining and/or the console can be mounted on the mounting means of the first transverse strut, the second transverse strut and/or the console support section in a particularly simple fashion. In this respect, it is proposed to utilize a so-called clip connection in order to realize a particularly fast installation of the inside roof lining and/or the console.

In another preferred embodiment of the protective sunshade arrangement according to the invention, the mounting means are arranged in such a way that the inside roof lining and/or the console can be mounted on the far side of the first transverse strut, the second transverse strut and/or the console support section referred to the cover. This makes it possible to mount the inside roof lining and/or the console in a particularly simple fashion without covering the gap that is required for the cover and arranged between the side facing the cover and another part of the motor vehicle such as, for example, the vehicle roof or the windowpane.

The longitudinal struts and/or the transverse struts of the frame of the protective sunshade arrangement may, in principle, be realized as part of the car body. In order to allow a particularly simple assembly of the protective sunshade arrangement, as well as a simple installation of the protective sunshade arrangement in the motor vehicle, the protective sunshade arrangement according to one particularly preferred embodiment of the invention is realized in the form of a module that can be installed in the motor vehicle.

In order to realize a secure installation of the inside roof lining and/or a roof console in the motor vehicle and to prevent the inside roof lining and/or the roof console from obstructing the extraction of the cover in the extracting direction, the protective sunshade arrangement according to another particularly preferred embodiment of the invention can be arranged such that a transverse gap for guiding through the cover in the extracting direction is formed between the side of the first transverse strut and/or the console support section that faces the cover and another part of the motor vehicle, preferably a vehicle roof and/or a windowpane.

In another preferred embodiment of the protective sunshade arrangement according to the invention, a first locking means, preferably a locking depression or a locking recess is provided on the first transverse strut and/or the console support section in order to lock the cover. Due to these measures, the cover can be locked, for example, centrally in its idle position without requiring locking means on the longitudinal struts that guide the cover. Furthermore, this makes it possible to realize a locking mechanism with a particularly space-saving and compact design.

In another preferred embodiment of the protective sunshade arrangement according to the invention, the cover is provided with a second locking means that is realized complementary to the first locking means, preferably a locking projection or a locking hook, in order to lock the cover. For example, the locking projection or locking hook on the cover can engage into the locking depression or locking recess on the first transverse strut and/or the console support section in order to lock the cover in the idle position. Furthermore, an actuating means is preferably provided on the cover in order to disengage the locked cover. For example, the locking projection or locking hook could be moved out of the locking depression or locking recess on the first transverse strut and/or the console support section with the aid of the actuating means in order to disengage the locked cover from the idle position.

In another advantageous embodiment of the protective sunshade arrangement according to the invention, the cover features a rigid support section that preferably has the shape of a plate and a preferably flexible canvas cover that can be extracted from the cover roller and is fixed on the support section. Due to the rigid support section, other functional components such as, for example, pivoted sun visors can be securely mounted on the cover.

The inventive motor vehicle features a protective sunshade arrangement according to an embodiment of the invention for one of the windowpanes of the motor vehicle.

In one advantageous embodiment of the inventive motor vehicle, the first transverse strut and/or the console support section is/are arranged such that a transverse gap for guiding through the cover in the extracting direction is formed between the side of the first transverse strut and/or the console support section that faces the cover and another part of the motor vehicle, preferably a vehicle roof and/or a windowpane. As already mentioned above, the transverse strut and/or the console support section therefore make(s) it possible to securely arrange and mount an inside roof lining and/or a roof console in the vehicle while the transverse gap ensures that the cover can be extracted in an unobstructed fashion in the extracting direction.

In one preferred embodiment of the inventive motor vehicle, an inside roof lining that conceals the cover roller therefore is mounted on the first transverse strut with the aid of the mounting means.

In another preferred embodiment of the inventive motor vehicle, a roof console is also mounted on the inside roof lining or on the first transverse strut, preferably also on the second transverse strut, particularly also on the console support section, with the aid of the mounting means. In this case, the roof console preferably consists of several parts, wherein different functional components of the motor vehicle can be arranged in the individual roof console parts.

In order to install a roof console of sufficient size, the inside roof lining of one particularly preferred embodiment of the inventive motor vehicle features a recess, in which the roof console is arranged. For example, the inside roof lining may feature a marginal incision, in which the roof console is arranged.

The special advantages associated with the protective sunshade arrangement according to the embodiments of the invention manifest themselves, in particular, in another preferred embodiment of the inventive motor vehicle, in which functional components of the motor vehicle, preferably control units or gauges, are integrated into and/or mounted on the roof console or the frame. Since the protective sunshade arrangement allows a particularly stable installation of the roof console in the motor vehicle, said console is also able to accommodate particularly heavy functional components of the motor vehicle.

BRIEF DESCRIPTION OF THE DRAWINGS

The present invention will hereinafter be described in conjunction with the following drawing figures, wherein like numerals denote like elements, and:

FIG. 1 shows a partial side view of a motor vehicle with a sectional representation of an embodiment of the protective sunshade arrangement according to the invention, in which the cover is in the idle position;

FIG. 2 shows a bottom view of the protective sunshade arrangement according to FIG. 1;

FIG. 3 shows the motor vehicle according to FIG. 1 with the cover in an operative position; and FIG. 4 shows a bottom view of the protective sunshade arrangement according to FIG. 3.

DETAILED DESCRIPTION

The following detailed description is merely exemplary in nature and is not intended to limit the application and uses. Furthermore, there is no intention to be bound by any theory presented in the preceding background and summary or the following detailed description.

FIG. 1 shows a cross section through an embodiment of the inventive motor vehicle 2. In the figures, the forward direction of the motor vehicle 2 is indicated with the arrow 4 while the rearward direction is indicated with the arrow 6. Furthermore, the transverse directions are respectively indicated with arrows 8 and 10 and the vertical directions are respectively indicated with arrows 12 and 14.

The body of the motor vehicle 2 comprises, among other things, a roof frame 16 and two B-columns 18 that lie opposite of one another in the respective transverse direction 8 or 10 and of which only one is illustrated in FIG. 1. A vehicle roof 20 is mounted on the roof frame 16 of the motor vehicle 2 and forms the upper boundary of a rear section of the vehicle interior 22 referred to the vertical direction 14. FIG. 1 furthermore shows the backrest of a vehicle seat 24 that is arranged in the first row of seats within the vehicle interior 22.

A wrap-around windowpane 26 forms the boundary of the vehicle interior 22 in the vertical direction 14 and in the forward direction 4 within the region of the vehicle interior 22, in which the vehicle seat 24 and the entire front row of seats is respectively arranged. The wrap-around windowpane 26 comprises a windowpane section 28 on the roof side that is connected to the vehicle roof 20 in the rearward direction 6, as well as a front windowpane section that forms a windshield and is not visible in FIG. 1. The windowpane section 28 on the roof side and the not-shown front windowpane section are realized in one piece. Referred to the respective transverse direction 8 or 10, the wrap-around windowpane 26 preferably extends from one roof frame 16 to the opposite roof frame or from one (not-shown) A-column to the opposite A-column such that the vehicle occupants seated in the first row of seats have a panoramic view through the wrap-around windowpane 26.

An inside roof lining 30 is provided underneath the vehicle roof 20 referred to the vertical direction 12. In this case, a receptacle space 32 is formed between the inside roof lining 30 and the vehicle roof 20 referred to the respective vertical direction 12 or 14. In addition, a roof console 34 is arranged within the vehicle interior 22 on the roof side thereof, namely centrally referred to the respective transverse direction 8 or 10. Although the roof console 34 may be mounted on the inner side of the roof lining 30, the roof console 34 according to the present embodiment is arranged within a recess 36 in the inside roof lining 30 that is indicated in FIG. 2. In this case, the recess 36 has an incision in the edge 38 of the inside roof lining 30 that points in the forward direction 4. The roof console 34 is designed with such a length that it protrudes over the edge 38 of the inside roof lining 30 in the forward direction 4.

A protective sunshade arrangement 40 is furthermore provided within the motor vehicle 2 and described in greater detail below with reference to FIG. 1 and FIG. 2. The protective sunshade arrangement 40 features a frame 42. The frame 42 is composed of two opposing longitudinal struts 44, 46. The longitudinal struts 44, 46 respectively extend in the forward or rearward direction 4, 6 of the motor vehicle 2 and are mounted on the opposing uprights of the roof frame 16. Alternatively, the longitudinal struts 44, 46 may also form part of the roof frame 16 and consequently be realized in one piece therewith. The longitudinal struts 44, 46 serve for respectively guiding the cover 48 of the protective sunshade arrangement 40 that is described in greater detail below in the forward and rearward directions 4, 6.

The frame 42 of the protective sunshade arrangement 40 furthermore comprises a first transverse strut 50 and a second transverse strut 52. The second transverse strut 52 connects the ends of the longitudinal struts 44, 46 that point in the rearward direction 6 and is realized continuously. The first transverse strut 50 also connects the two longitudinal struts 44, 46 and is realized continuously, but the first transverse strut 50 is arranged behind and spaced apart from the second transverse strut 52 in the forward direction 4 that also corresponds to the extracting direction of the cover 48 to be described below in this embodiment. Both transverse struts 50, 52 essentially extend in the respective transverse direction 8 or 10.

The protective sunshade arrangement 40 furthermore comprises a cover roller 54 that is arranged between the first and the second transverse strut 50, 52 referred to the forward and rearward directions 4, 6 and between the longitudinal struts 44, 46 referred to the respective transverse direction 8 or 10 as shown, in particular, in FIG. 2. Referred to the respective transverse direction 8 or 10, the cover roller 54 is mounted on the longitudinal struts 44 and 46 and can be turned about an axis of rotation 56 extending in the respective transverse direction 8 or 10 such that the cover 48 rolled up on the cover roller 54 can be extracted in an extracting direction that —as mentioned above —corresponds to the forward direction 4 in this embodiment. Consequently, the first transverse strut 50 is arranged behind the cover roller 54 when looking toward the extracting direction 4 while the second transverse strut 52 is arranged in front of the cover roller 54 when looking toward the extracting direction 4.

In addition, a console support section 58 of the frame 42 is arranged on the first transverse strut 50, and the console support section is arranged behind the first transverse strut 50 referred to the extracting direction 4 and centrally referred to the respective transverse direction 8 or 10. The console support section 58 consists of a U-shaped strut 60, the ends of which are rigidly connected to the first transverse strut 50. The U-shaped strut 60 of the console support section 58 also contains a locking recess 62, the function of which is described in detail below.

The above-mentioned cover 48 features a flexible canvas cover 64 on the side of the cover roller and a rigid plate-shaped support section 66, and the canvas cover 64 is fixed on the support section 66 with its end on the extraction side. A locking projection 68 that can be moved relative to the support section 66 in the respective vertical direction 12 or 14 is arranged on the support section 66 and protrudes into the locking recess 62 on the console support section 58 in the idle position of the cover 48 shown in FIG. 1 and FIG. 2 such that the cover 48 is locked in this idle position. In order to disengage the locking projection 68 from the locking recess 62 in the vertical direction 14, a corresponding actuating means 70 is provided on the support section 66 such that the locked cover 48 can be disengaged by actuating the actuating means 70 and the cover 48 can be displaced in the extracting direction 4.

In the embodiment shown, the protective sunshade arrangement 40 is realized in the form of a module that is subsequently installed in the motor vehicle 2. The protective sunshade arrangement 40 was mounted within the motor vehicle 2 by connecting the longitudinal struts 44, 46 to the corresponding uprights of the roof frame 16. In this case, the longitudinal struts 44, 46 were installed in such a way that a transverse gap 72 for guiding through and extracting the cover 48 in the extracting direction 4 remains between the first transverse strut 50 and the console support section 58 of the frame 42 on one hand and the inner side of the vehicle roof 20 on the other hand. Subsequently, the inside roof lining 30 was installed in such a way that the receptacle space 32, in which the cover roller 54 of the protective sunshade arrangement 40 is accommodated, was formed within the vehicle interior 22 and the cover roller 54 was concealed relative to the vehicle interior 22 by the inside roof lining 30.

In order to securely mount the inside roof lining 30 within the vehicle interior 22, mounting depressions 74 are provided on the far side of the first transverse strut 50 referred to the transverse gap 72 and the cover 48, respectively, as well as on the downwardly directed side of the second transverse strut 52 referred to the vertical direction 12 in order to mount the inside roof lining 30 on the first transverse strut 50 and on the second transverse strut 52 with the aid of mounting means such as, for example, clips. Subsequently, the roof console 34 is mounted on the console support section 58, the first transverse strut 50 and the second transverse strut 52 within the recess 36 of the inside roof lining 30 with the aid of clips or the like, wherein additional mounting depressions 76 are provided in the U-shaped strut 60, the first transverse strut 50 and the second transverse strut 52 for this purpose. These mounting depressions 76 are also arranged on the downwardly directed side of the U-shaped strut 60, the first transverse strut 50 and the second transverse strut 52 referred to the vertical direction 12 and therefore situated on the far side of the aforementioned components referred to the transverse gap 72 and the cover 48, respectively.

Due to the first transverse strut 50 and the console support section 58, the inside roof lining 30 and the roof console 34 can be installed in the vehicle interior 22 in a particularly stable fashion, wherein the cover roller 54 is simultaneously concealed relative to the vehicle interior 22 without requiring an additional housing for this purpose. The stable mounting now also makes it possible to integrate and/or install functional components of the motor vehicle 2 such as, for example, control units or gauges into the roof console 34 and/or the inside roof lining 30, and the additional weight of these functional components can be securely supported by the inside roof lining 30 or the roof console 34. The functional components may alternatively or additionally be directly integrated into the frame 42 or mounted thereon, respectively.

FIG. 3 and FIG. 4 show the cover 48 of the protective sunshade arrangement 40 in a forward operative position.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A protective sunshade arrangement for a windowpane of a motor vehicle, comprising:
a frame;
a first longitudinal strut and a second longitudinal strut opposing the first longitudinal strut; and
a cover guided by the first longitudinal strut and the second longitudinal strut that can be extracted in an extracting direction from a cover roller arranged between the first longitudinal strut and the second longitudinal strut, wherein the frame further comprises a first transverse strut that extends between the first longitudinal strut and the second longitudinal strut and arranged behind the cover roller when looking toward the extracting direction.

2. The protective sunshade arrangement according to claim 1, wherein the frame further comprises a second transverse strut that extends between the first longitudinal strut and the second longitudinal strut and is arranged in front of the cover roller.

3. The protective sunshade arrangement according to claim 2, wherein the first transverse strut or the second transverse strut extend from the first longitudinal strut to the second longitudinal.

4. The protective sunshade arrangement according to claim 1, wherein the frame furthermore comprises a console support section arranged behind the first transverse strut when looking toward the extracting direction and centrally mounted on the first transverse strut.

5. The protective sunshade arrangement according to claim 4, wherein the console support section is essentially realized in a form of a U-shaped strut.

6. The protective sunshade arrangement according to claim 2, wherein the frame includes a console support section, and a mount for an inside roof lining or a console is provided on the first transverse strut, the second transverse strut or the console support section.

7. The protective sunshade arrangement according to claim 6, wherein the mount is arranged in such a way that the inside roof lining or the console can be mounted on a far side of the first transverse strut, the second transverse strut or the console support section.

8. The protective sunshade arrangement according to claim 1, wherein the protective sunshade arrangement is realized in a form of a module that can be installed in the motor vehicle.

9. The protective sunshade arrangement according to claim 8, wherein the frame includes a console support section, and the protective sunshade arrangement can be installed such that a transverse gap is formed between a side of the first transverse strut, or the console support section that faces the cover and another part of the motor vehicle, the transverse gap configured for guiding the cover in the extracting direction.

10. The protective sunshade arrangement according to claim 1, wherein a first locking means is provided on the first transverse strut or a console support section in order to lock the cover.

11. The protective sunshade arrangement according to claim 10, wherein the cover is provided with a second locking means that is realized complementary to the first locking means in order to lock the cover.

12. The protective sunshade arrangement according to claim 1, wherein the cover comprises a rigid support section that has a shape of a plate and a flexible canvas that can be extracted from the cover roller and is fixed on the rigid support section.

* * * * *